United States Patent Office 3,451,865
Patented June 24, 1969

---

3,451,865
CORROSION-PROOFING PRIMER COATING AND METAL ARTICLE COATED THEREWITH
John Bretz, Cleveland, Ohio, assignor to The Lubrizol Corporation, Wickliffe, Ohio, a corporation of Ohio
No Drawing. Filed June 3, 1966, Ser. No. 554,974
Int. Cl. C23f 7/26; C08f 21/02
U.S. Cl. 148—6.16                                  10 Claims

ABSTRACT OF THE DISCLOSURE

Metal coating compositions are prepared from (A) a composition consisting essentially of one part of a polymeric polyol, about 0.05–5.0 parts of an epoxy aryl ether, and about 0.1–2.0 parts of phosphoric acid; (B) about 0.01–1.5 parts of a dilute aqueous solution of an inorganic, water-soluble chromium compound containing hexavalent chromium; and (C) about 4–30 parts of a filler. These compositions are particularly useful as protective primers over which paints may be applied.

---

This invention relates to liquid compositions suitable for use in providing protective films for metal surfaces, to metal articles coated therewith, and to such articles further coated with a siccative organic topcoat. More particularly, the invention relates to a composition of matter suitable for coating metal surfaces, said composition comprising a solution in at least one organic solvent of:

(A) About 50–65 parts by weight of a composition consisting essentially of one part by weight of a polymeric polyol, about 0.05–5.0 parts of an epoxy aryl ether, and about 0.1–2.0 parts of phosphoric acid;

(B) About 0.01–1.5 parts of a dilute aqueous solution of at least one inorganic, water-soluble chromium compound, at least a portion of the chromium in said solution being hexavalent chromium; and (C) About 4–30 parts of a nonreactive inorganic filler.

The treatment of metal surfaces, especially ferrous metal surfaces, to provide them with protective chemical coatings has long been known. Such coatings usually are provided by treatment with an acidic, inorganic chemical solution which reacts with the metal surface to provide an integral coating. Coatings of this type have the important advantage of being permanent, i.e., they cannot be removed by ordinary handling or minor abrasive wear. However, they are expensive to use because of the inherent inefficiency of their application.

Another type of treatment to provide a protective surface coating involves the deposition of a residual film from a solution of a film-forming material in a relatively volatile solvent. The resulting film is not attached chemically to the metal surface and must, therefore, depend for its permanence on the attraction of physical forces. While films of this type can be much more efficiently applied than those described above, they are not as permanent.

A principal object of the present invention, therefore, is to provide a coating composition for metal surfaces which combines some of the advantages of the integral coating with those of the film-forming coating.

Another object is to provide treated metal surfaces which are resistant to corrosion.

Still another object is to provide protective coatings for metal surfaces which are both permanent and susceptible to efficient application.

Other objects will be apparent from the following description.

Component A

The major constituent of the coating composition of the present invention contains one part by weight of a polymeric polyol, about 0.05–5.0 parts of an epoxy aryl ether and about 0.1–2.0 parts of phosphoric acid. This component is disclosed and claimed in U.S. Patent 3,133,838.

The polymeric polyol is preferably a copolymer of allyl alcohol and a styrene and may conveniently be prepared by copolymerization of an approximately equimolar mixture of these two monomers. The molecular weight of the copolymer should be within the range from about 500 to about 2500. The styrene comonomer may be styrene itself or it may be any of the various substituted styrenes such as chlorostyrene, alkyl-substituted styrenes, and styrenes containing substituents (especially alkyl groups, preferably methyl) on the alpha carbon atom of the vinyl side chain.

Epoxy aryl ethers are conveniently prepared by the reaction of epichlorohydrin, epibromohydrin, the epihalohydrins of sugars, etc., with phenolic compounds. Thus, the reaction of epichlorohydrin and amylphenol, shown below, produces an epoxy aryl ether of the indicated structure.

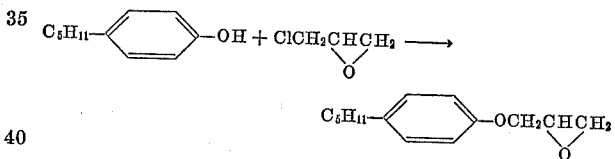

Ordinarily, for the purposes of this invention, the phenolic compound is bisphenol A, a phenol-formaldehyde resin or the like. Commercially available products of this type, prepared from bisphenol A, include the Epon resins, the Epotuf resins, the DER resins, and the DEN resins. Particular methods for the preparation of such epoxy resins and other epoxy aryl ethers are well known to those skilled in the art and are disclosed in a number of U.S. patents.

The phosphoric acid constituent of Component A is desirably an aqueous solution of phosphoric acid such as 85% aqueous acid. More dilute or more concentrated solutions may sometimes be used, and occasionally it is convenient to use a phosphoric acid-phosphorus pentoxide mixture.

It is generally convenient to prepare Component A in solution in an organic solvent. Oxygenated solvents such as methyl isobutyl ketone, isobutyl alcohol, ethyl acetate, ethylene glycol monobutyl ether and the like are preferred. Mixtures of oxygenated solvents and hydrocarbon solvents, especially aromatic hydrocarbons, may also be used.

The following examples illustrate the preparation of compositions suitable as Component A.

EXAMPLE 1

A solution of 54 parts of an allyl alcohol-styrene copolymer of molecular weight 1100 in 54 parts of methyl isobutyl ketone is added to a solution of 41.4 parts of an epoxy aryl ether of molecular weight 950, prepared by the reaction of bisphenol A and epichlorohydrin, in 14 grams of a 2:1 mixture of methyl isobutyl ketone and xylene. To the resulting solution there is added 336 parts of a 2:1:1 mixture of methyl isobutyl ketone, ethyl acetate and isobutyl alcohol. Finally, 100 grams of 85% aqueous phosphoric acid is added.

EXAMPLE 2

A solution of 200 parts of a copolymer of allyl alcohol and styrene, as used in Example 1, in 200 parts of ethylene glycol monobutyl ether is heated to 120° F. To this solution is added 205 parts of a solution consisting of 75% (by weight) of the epichlorohydrin-bisphenol A reaction product of Example 1, 16.7% xylene and 8.3% methyl isobutyl ketone, followed by 78.5 parts of 85% phosphoric acid. The solution is mixed for one hour at 125° F. There is obtained 680 parts of product.

Component B

This component is a dilute aqueous chromium-containing solution. The solution is formed by dissolving in water a chromium compound or a mixture of chromium compounds, the chromium being at least partially hexavalent and preferably at least about 10% hexavalent. It is often advantageous to employ hexavalent chromium compounds exclusively; when combined with the organic constituents of the composition of this invention, part of the hexavalent chromium thus supplied will ordinarily be reduced to trivalent chromium. Suitable hexavalent chromium compounds include chromic acid, sodium dichromate, potassium chromate, potassium dichromate, calcium dichromate and the like. In general, any water-soluble hexavalent chromium compound will be suitable. If trivalent chromium is to be initially included, it may be furnished by such compounds as chromic acetate, chromic chloride hexahydrate, chromic nitrate, and soluble coordination compounds of trivalent chromium such as the ammine complexes.

A particularly useful chromium-containing solution is described and claimed in copending application Ser. No. 278,990, filed May 8, 1963. This solution contains calcium dichromate and partially reduced chromic acid in which the ratio of hexavalent to trivalent chromium is about 0.5–5.0, preferably about 0.8–3.0. In this solution, about 20–80%, preferably about 30–70% and most often about 50%, of the chromium content is contributed by said partically reduced chromic acid. The total chromium content of the solution is about 0.01–0.3% by weight, and desirably about 0.03–0.1%.

To prepare the partially reduced chromic acid used for the preparation of Component B, such oxidizable compounds as formaldehyde, ethanol, ethylene glycol or a similar polyhydroxy compound, phenol, hydroquinone, potassium iodide or the like may be used. Typical reduction methods are described in U.S. Patents 2,768,104 and 3,063,877. From the standpoint of convenience and economy, however, it is generally preferred to use methanol as the reducing agent.

The following examples illustrate typical methods for the preparation of compositions suitable for use as Component B.

EXAMPLE 3

A solution of 1100 grams of chromic acid in 2500 grams of water is heated to 90–100° C., and a mixture of 128 grams of methanol and 128 grams of water is added dropwise. The reaction which occurs is highly exothermic, and the temperature remains at 90–100° C. during the methanol addition. The solution is then stirred for one hour to insure complete reaction and is diluted with sufficient water to yield 3 liters of solution. The resulting product contains 14.75% chromium, and the ratio of hexavalent to trivalent chromium is 1.15.

The product prepared as described above is dissolved in water in an amount sufficient to provide 0.025% of chromium. An equvalent amount of calcium dichromate (sufficient to provide 0.025% of chromium) is added.

EXAMPLE 4

The procedure of Example 3 is followed, except that the final solution is prepared to contain 0.09% chromium contributed by partially reduced chromic acid and 0.18% chromium contributed by calcium dichromate.

EXAMPLE 5

The preparation of partially reduced chromic acid is carried out as described in Example 3, except that a mixture of 48 grams of methanol and 48 grams of water is employed. The resulting product contains 15.45% chromium and has a ratio of hexavalent to trivalent chromium of 3.0. A solution is then prepared containing this partially reduced chromic acid in an amount to supply 0.025% chromium, and calcium dichromate in an equivalent amount.

EXAMPLE 6

The procedure of Example 5 is repeated except that the final aqueous solution is prepared to contain partially reduced chromic acid in an amount equivalent to 0.03% chromium and calcium dichromate in an amount equivalent to 0.09% chromium.

EXAMPLE 7

A solution of calcium dichromate is prepared by dissolving 38.4 parts of chromic acid and 12.9 parts of lime in 48.7 parts of water. A solution of partially reduced chromic acid is prepared as described in Example 3, from 53.0 parts of chromic acid, 2.8 parts of methanol and 44.2 parts of water. A dilute aqueous solution is then prepared from 32.2 parts of the calcium dichromate solution and 67.8 parts of the partially reduced chromic acid solution.

Component C

As previously indicated, Component C is a nonreactive inorganic filler material. Thus, it is generally a finely divided solid which does not undergo reaction with the other constituents of the mixture to change the chemical nature thereof to any appreciable extent. Silica is the preferred filler material; other suitable materials may include alumina, carbon black, titanium dioxide, magnesium silicate, clays such as montmorillonite and attapulgite, and naturally occurring mixtures such as fuller's earth, bentonite and the like. The filler may also serve as a pigment.

The compositions of the present invention contain about 50–65 parts by weight of Component A, about 0.1–1.5 parts of Component B, and about 4–30 parts of Component C. The preferred composition range is about 60–65 parts of A, about 0.5–1.0 part of B, and about 5–10 parts of C.

The composition is constituted as a solution in one or more organic solvents. Typical solvents are those described hereinabove as appropriate for the preparation of Component A, and include, in general, oxygenated solvents and mixtures thereof with hydrocarbon solvents. In general, the solvent may comprise about 25–40% by physical attractiveness and marketability, it is often appropriate to add a dye to the final solution. This dye may be of any color suitable to provide an attractive final product.

The preparation of a typical composition according to the present invention is illustrated by the following example.

EXAMPLE 8

To 475 parts of the composition of Example 2 is added 2.95 parts of the product of Example 7 in 0.38 part of water. The solution is mixed for 30 minutes by circulation through a gear pump at 78–86° F. A mixture of 17.1 parts of ethylene glycol monobutyl ether and 17.1 parts of a high-boiling (about 150° C.) aromatic solvent is then added, followed by 33.3 parts of colloidal silica. Circulation through the gear pump is continued for 9 hours at 130° F. to render the mixture homogeneous, after which 0.05 part of a dye solution is introduced. There is obtained a solution with the following composition.

|  | Percent |
|---|---|
| Component A | 61.5 |
| Component B | 0.61 |
| Component C | 6.10 |
| Solvents | 31.78 |
| Dye solution | 0.01 |
|  | 100.00 |

The compositions of the present invention may be applied to a metal surface in any suitable way, such as dip-coating, roller-coating or spraying. The composition is used in concentrations suitable to provide a protective film weighing about 25–300 mg. per square foot of area. This range of thickness describes the final, dried protective film; it does not apply to the freshly deposited liquid composition which is the precursor of the protective coating.

Following the application of the coating composition, the object is dried either by allowing the solvents to evaporate at room temperature or by baking, typically at about 100–400° C. The primer-coated surface may then be further treated with a siccative organic coating composition, e.g., an alkyd, epoxy or acrylic paint.

The compositions of the present invention are particularly useful for providing primer coatings for steel surfaces. They may also be used to coat aluminum, galvanized steel, and similar metal surfaces.

The effect of the compositions of this invention as protective primers for metal surfaces is shown in the Salt Fog Corrosion Test. In this test, steel panels are cleaned with alkali, rinsed with water and coated with a solution of the composition of Example 8 in a 1:1 (by weight) mixture of ethylene glycol monobutyl ether and a high-boiling (about 150° C.) aromatic solvent. The solution contains 10% nonvolatile matter. The panels thus coated are baked for 5 minutes at 450° F., after which a topcoat of a thermosetting acrylic appliance paint is applied. A second panel is given a primer coat of the composition of Example 2, which is the coating composition described in U.S. Patent 3,133,838. A third panel is given no primer coating but is directly coated with the acrylic topcoat. A second set of panels is given the same treatment except that the topcoat is an acrylic paint suitable for outdoor use under severe weather conditions.

The topcoated panels are then scribed with a pointed instrument to give a vertical line one inch from the edge of the panel, starting one inch from the top of the panel and ending one inch from the bottom thereof. The scribed panels are placed in a cabinet containing a 5% aqueous sodium chloride solution at 95° F. Air is bubbled through this solution to produce a corrosive salt atmosphere which acts on the surface of the test panels, suspended above the level of the salt solution. The exposure time is 250 hours. Immediately after exposure, a piece of adhesive tape is applied to the scribed line to remove nonadhering paint. Taping in this manner is continued until all such paint is removed, after which time the percentage of paint adhering to the panel is measured. The results are given in the following table.

|  | Appliance paint | | Outdoor paint | |
|---|---|---|---|---|
| Primer coat | Film weight, mg./sq. ft. | Percent paint adhesion | Film weight, mg./sq. ft. | Percent paint adhesion |
| None | | 31 | | 0 |
| Product of Example 2 | 165 | 87 | 181 | 65 |
| Product of Example 8 | 212 | 93 | 231 | 77 |

To further evaluate the compositions of this invention as primer coats, a comparison is made between the composition of Example 8 (diluted to 24% nonvolatile matter with a 1:1 mixture of ethylene glycol monobutyl ether and high-boiling aromatic solvent) and a polyvinylbutyral primer coat in the following series of tests. For these tests, a first panel is coated with the composition of Example 8, baked for 5 minutes at 450° F., and further coated with an epoxy primer, a white topcoat and a sealer coat of varnish. A second panel is similarly coated with the polyvinylbutyral primer and then with the epoxy primer, topcoat and sealer coat. A third panel receives no initial primer coat but is immediately treated with the epoxy and further coating compositions. These panels are then subjected to the Salt Fog Corrosion Test described above and, in addition, to the following two tests.

In the Vise Bend Test, the panel is bent at a 180° angle in a vise and adhesive tape is applied to the bend until all loose paint is removed. The percentage of paint adhering to the panel at the point of the bend is then measured.

In the Olson Cup Test, a cup-shaped depression is made in the panel and adhesive tape is applied to the convex side of the depression until all loose paint is removed. The panel is then similarly evaluated for paint adhesion.

The results obtained in the tests described above are given in the following table.

|  | Percent paint adhesion | | |
|---|---|---|---|
| Primer coat | Salt fog | Vise bend | Olson cup |
| None | | | |
| Polyvinylbutyral | 16 | 65 | 50 |
| Product of Example 8 | 99 | 90 | 75 |
| | 98 | 100 | 95 |

The compositions of this invention may also be used in combination with or without a lubricant (e.g., a mineral or other oil) as drawing compositions for metals. For this purpose, the coating composition is applied first and the lubricant, if used, is applied thereon.

What is claimed is:

1. A composition of matter suitable for coating metal surfaces, said composition comprising a solution in at least one organic solvent of:
   (A) about 50–65 parts by weight of a composition consisting essentially of one part by weight of a copolymer of allyl alcohol and a styrene, about 0.05–5.0 parts of an epoxy aryl ether, and about 0.1–2.0 parts of phosphoric acid;
   (B) about 0.01–1.5 parts of a dilute aqueous solution of at least one inorganic, water-soluble chromium compound, at least a portion of the chromium in said solution being hexavalent chromium; and
   (C) about 4–30 parts of a non-reactive inorganic filler.

2. The composition of claim 1 wherein the epoxy aryl ether of Component A is prepared by the reaction of an epihalohydrin with a phenolic compound.

3. The composition of claim 2 wherein the epihalohydrin is epichlorohydrin and the phenolic compound is bisphenol A.

4. The composition of claim 1 wherein Component B is a dilute aqueous solution containing (1) calcium dichromate and (2) partially reduced chromic acid in which the ratio of hexavalent to trivalent chromium is about 0.5–5.0, about 20–80% of the chromium content of said solution being contributed by said partially reduced chromic acid.

5. The composition of claim 1 wherein Component C is silica, alumina, carbon black, titanium dioxide, magnesium silicate or a clay.

6. The composition of claim 5 wherein Component C is silica.

7. A compositon according to claim 1 which consists essentially of a solution in a mixture of oxygenated and aromatic hydrocarbon solvents of:
  (A) about 60–65 parts by weight of a composition consisting essentially of one part by weight of a styrene-allyl alcohol copolymer, about 0.05–5.0 parts of the reaction product of epichlorohydrin and bisphenol A, and about 0.1–2.0 parts of phosphoric acid;
  (B) about 0.5–1.0 part of a dilute aqueous solution of (1) calcium dichromate and (2) partially reduced chromic acid in which the ratio of hexavalent to trivalent chromium is about 0.8–3.0, about 30–70% of the chromium content of said solution being contributed by said partially reduced chromic acid, and the total chromium content of said solution being about 0.01–0.3% by weight; and
  (C) about 5–10 parts of silica.

8. A method for providing a protective film for a metal article which comprises applying to the surface of said article a film comprising the composition of claim 1, and drying said film.

9. A metal article containing on its surface a protective coating provided according to the method of claim 8.

10. A metal article according to claim 9 which has been further provided with a siccative organic topcoat.

References Cited

UNITED STATES PATENTS

| | | | |
|---|---|---|---|
| 3,133,838 | 5/1964 | Higgins | 148—6.15 |
| 3,281,284 | 10/1966 | Dwors | 148—6.16 |

RALPH S. KENDALL, *Primary Examiner.*

U.S. Cl. X.R.

117—132; 148—6.2; 260—29.2